United States Patent [19]

Hofbauer

[11] 3,779,476

[45] Dec. 18, 1973

[54] MAGNETIC TAPE UNIT AND HUB ASSEMBLY THEREFORE

[76] Inventor: Thomas J. Hofbauer, 48 Lake Trl. East, Wayne, N.J. 07470

[22] Filed: Nov. 8, 1971

[21] Appl. No.: 196,599

[52] U.S. Cl. .................. 242/67.3, 242/71.8, 242/72

[51] Int. Cl. ....................... B65h 17/02, B65h 75/24

[58] Field of Search ........................ 242/55.19, 71.8, 242/55.17, 67.3, 72, 118.11, 56.9

[56] References Cited

UNITED STATES PATENTS

| | | | |
|---|---|---|---|
| 1,109,716 | 9/1914 | Turney | 242/71.8 |
| 3,289,966 | 12/1966 | Richel | 242/84 |
| 3,430,886 | 3/1969 | Sweeney | 242/118.41 X |
| 3,433,432 | 3/1969 | Willis | 242/118.1 |
| 3,550,872 | 12/1970 | Porterfield | 242/71.8 X |
| 3,675,867 | 7/1972 | Solomon | 242/55.19 A |

*Primary Examiner*—Louis R. Prince
*Assistant Examiner*—John M. Jillions
*Attorney*—Joseph M. Lane et al.

[57] ABSTRACT

A magnetic tape unit and hub assembly therefore in which the hub portion of the assembly is expansible in a radial direction and has a camming surface which is adapted to cam an adjacent hub member outwardly when the hub members are placed in an abutting relationship on a common support. A method for winding magnetic tape onto hub assemblies of the above type.

12 Claims, 5 Drawing Figures

INVENTOR
THOMAS J. HOFBAUER

PATENTED DEC 18 1973

3,779,476

SHEET 2 OF 2

INVENTOR
THOMAS J. HOFBAUER

MAGNETIC TAPE UNIT AND HUB ASSEMBLY THEREFORE

BACKGROUND OF THE INVENTION

This invention relates to a magnetic tape unit and a hub assembly therefore, and, more particularly, to such a unit and assembly having a hub portion which is expansible radially outwardly during winding of the taoe thereon so that it can be contracted later to place a predetermined slack in the tape.

Due to the ever increasing popularity of self-contained tape units such as the endless loop eight-track cartridge and the cassette, various techniques have been proposed for automatically winding the tape on a plurality of reels or hubs at high speeds before the hubs are placed into their casings. For example, in U.S. Pat. No. 3,549,099, of which applicant is a co-inventor and which is assigned to the same assignee as the present invention, an automatic winding apparatus is provided which automatically winds magnetic tape onto a plurality of rotating hubs driven in unison on a common shaft. After a predetermined supply of the tape has been wound on each hub, a spring bias pivoted guide arm diverts the tape from the completed hub to the next adjacent hub by movement of a carriage on which the arm is pivotally mounted.

After the tape has been sequentially wound on the hubs in the above manner, each hub is then placed into a casing whereby the tape is passed over guide rollers, pressure pads, etc. and the casing closed to form the final unit.

Although this apparatus has been highly successful in reducing the amount of time and labor required to manufacture these tape units, it did not eliminate an ancillary manufacturing step which has to be performed by hand, especially in connection with the endless loop cartrigdes mentioned above. In particular, in these latter units the tape travels in an endless path from the inner loop of the supply of tape on the hub, past the guide rollers, pressure pads, etc., and onto the outer loop of the supply of tape. Due to this arrangement, it becomes necessary to create a slack in the tape so that during its travel it will not be hindered by the high frictional forces which are created when the tape is initially wound tightly on the hub in the manufacturing technique discussed above and in most other techniques now employed. One way of creating the slack is for the operator to pick off four or five outer loops from the supply of the wound tape, splice the outer end with the inner end extending from the inner loop of the tape, and then hand wind the tape back onto the outer portion of the supply in order to create the necessary slack. Also, after the hub assembly, with the tape, had been placed in a casing, the unit had to be "played" by inserting same in appropriate play equipment so that the slack tape could establish an equilibrium, and create a minimum frictional resistance to rotation.

Another method of creating the slack is to insert spacers adjacent the hub to enlarge the effective diameter of the hub during the winding operation, and to remove the spacers after the tape has been wound on the hub to create the slack.

It can be appreciated that both of these operations prevent complete automation of the manufacturing process, and substantially increase the amount of time and labor required to complete the final product.

SUMMARY OF THE INVENTION

It is therefore an object of the present invention to provide a self-contained tape unit and hub therefor of the above type in which a predetermined amount of slack is automatically put on the tape wound onto each hub assembly in a simple and expeditious manner, without the need for spacers or the like.

Toward the fulfillment of this and other objects, the tape unit of the present invention comprises at least one hub member adapted for expansion in a radial direction, a supply of magnetic tape extending over said hub member, a camming surface adapted to engage a corresponding hub member of another hub assembly and expand said corresponding hub member outwardly upon said hub assemblies being placed in an abutting relationship on a common support, and a casing for said hub member.

DESCRIPTION OF THE PREFERRED EMBODIMENTS

Figure 1:
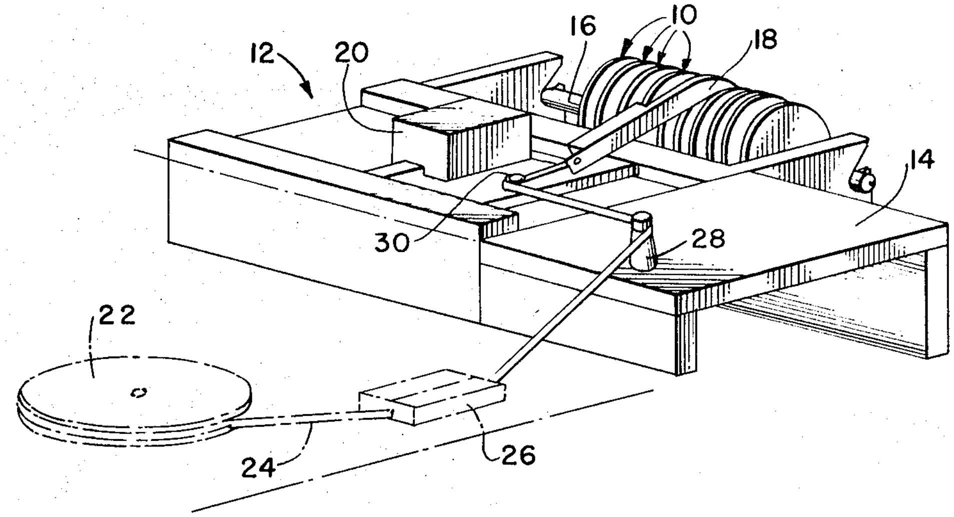
FIG. 1 is a perspective view of an automatic winding apparatus used to wind magnetic tape onto the hub assemblies of the present invention.

Referring to FIG. 1 of the drawings, the hub assemblies of the present invention are referred to in general by the reference numeral 10 and are shown mounted on an automatic tape winding apparatus 12 for winding magnetic tape sequentially onto the assemblies. Since the winding apparatus 12 forms no part of the present invention and since it is described in detail in the above cited patent, it will only be described generally for the purpose of the present application.

In brief, the winding apparatus 12 includes a base frame 14 on which a support shaft 16 for the hub assemblies 10 is rotatably mounted. A control arm 18 is pivotally mounted to a carriage 20 which is slidably mounted relative to the frame 14. The carriage 20 is normally movable in a direction from right to left as viewed in FIG. 1 due to the presence of a weight or the like on its end, with the movement being stepped sequentially by engagement of a solenoid operated plunger (not shown) with a series of stops which are adjustable to conform to the spacing of the hub assemblies 10. A supply reel 22 is provided on an adjacent support member, and contains a supply of magnetic tape 24 which passes by a recording head assembly 26 on its way to the control arm 18.

A post 28, along with a sensing device 30, provides a guide for the tape as it passes through the arm 18 and onto each reel. The programs on the tape 24 are separated by blanks or contain frequency signals so that, upon passage of the tape by the sensing device 30, the plunger discussed above is actuated to control the sequential movement of the carriage relative to the hub assemblies 10. The control arm 18 is connected to a linkage assembly in a manner so that the sequential movement of the carriage is accompanied by a pivoting movement of the control arm 18 from the position shown to a position between the flanges of the hub assemblies to transfer the tape from one hub to its adjacent hub before it is wound on the latter.

Figure 3:
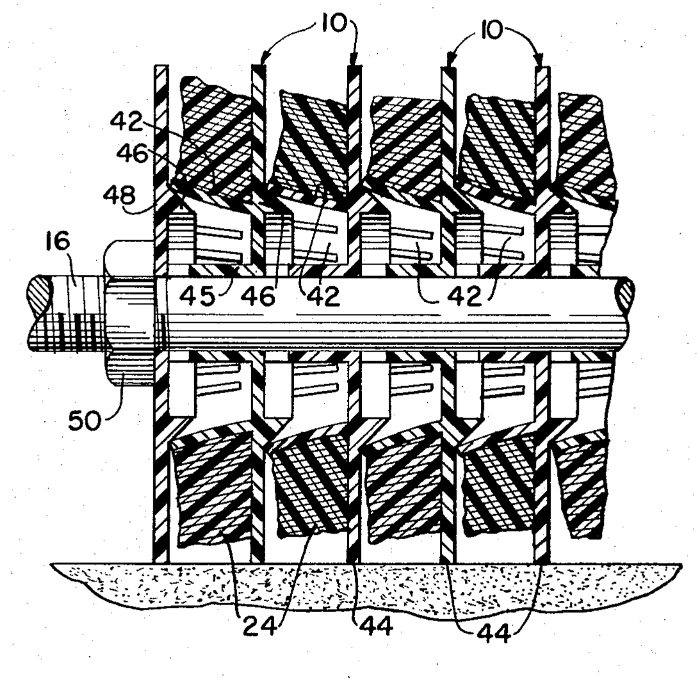
FIG. 3 is a transverse sectional view showing a plurality of hub assemblies of the present invention mounted on a common support shaft with a supply of magnetic tape extending around each assembly.
Figure 2:
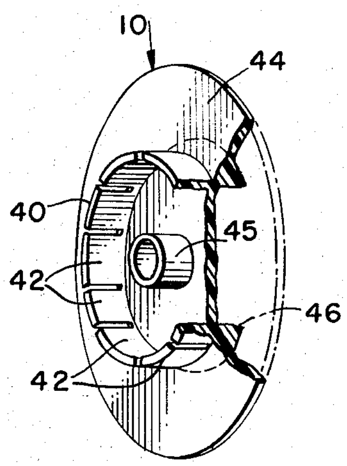
FIG. 2 is a perspective view of a hub assembly of the present invention.

The details of the hub assembly 10 and the manner in which a plurality of such assemblies are supported on the support shaft 16 are better shown with reference to FIGS. 2 and 3. In particular, each hub assembly comprises a hub portion 40 formed by a plurality of finger-like projections 42 which project from one face of a circular flange 44. An inner hub member 45 projects from the same face of the flange 44 and is adpted to receive the support shaft 16 during the winding operation and the spooling shaft of any associated tape unit.

A camming surface, in the form of a tapered ring 46, is provided on the opposite face of the flange 44. The inner diameter of the ring 46 is slightly less than the inner diameter of the hub 40 and the outer diameter of the ring is slightly greater than the inner diameter of the hub so that when the hub assemblies are urged together in an abutting relationship, as shown in FIG. 3, the tapered ring of each assembly cams the fingers of the hub of its adjacent assembly radially outward.

The hub assembly 10 at the left end of the shaft 16 engages an end plate 48 having a tapered ring 46 of the same type as that associated with a normal hub assembly, and the latter plate is maintained in a fixed relation on the support shaft 16 by means of a lock nut 50 threadably engaging the shaft, it being understood that a similar arrangement can also exist on the other end of the shaft.

Figure 4:
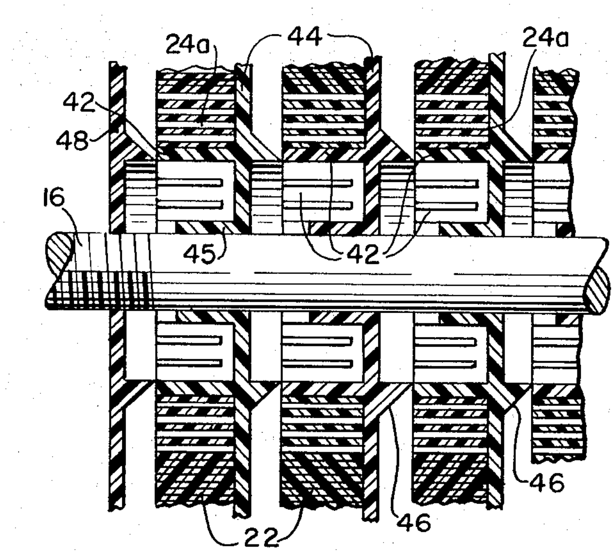
FIG. 4 is a view similar to FIG. 3 but showing the hub assemblies slightly separated from each other and the resulting slack formed in the supply of tape associated with each.

FIG. 4 shows the hub assemblies 10 being slightly separated after release of the lock nut 50 and the end plate 48. The disengagement of each hub assembly 10 from its adjacent hub assembly causes the fingers 42 forming each hub member 40 to contract to their normal position due to their internal spring bias. As a result, the effective diameter of each hub member 40 is reduced, which causes the tape wound thereon to become slack in the immediate vicinity of the hub, as shown by the reference 24a in the drawing.

In this manner, it is apparent that each hub assembly 10 with the tape 24 wound thereon simply has to be pulled off of the support shaft 16, the tape between each assembly cut, and the ends of the tape of each assembly spliced together before each assembly is ready for insertion into a casing or the like for use. This thus considerably reduces the time and expense involved in manufacturing the assembly since it eliminates the laborious steps of paying out a portion of the tape, winding the tape back after splicing to create a slack, and driving the hub asssembly after insertion in a casing in order to create an equilibrium, or inserting and removing one or more spacers, as discussed above.

Figure 5:
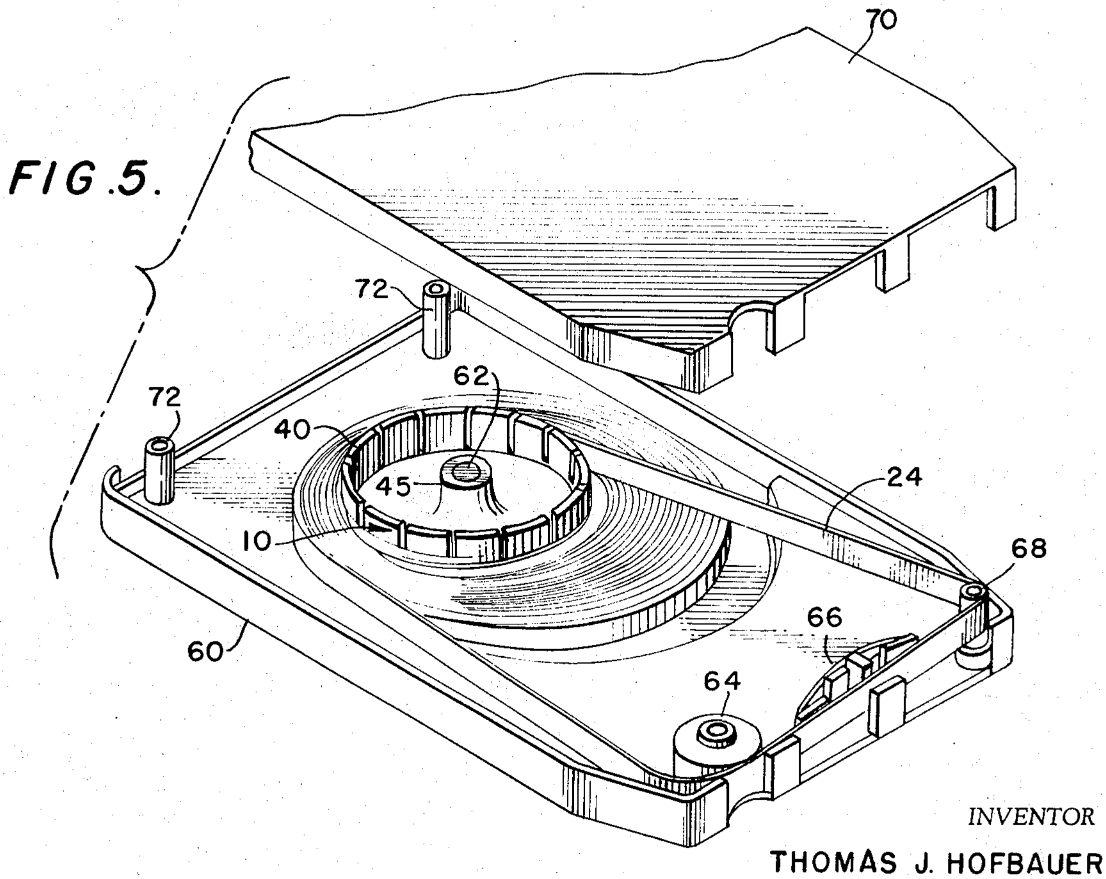
FIG. 5 is an exploded partial perspective view of an endless loop eight track cartridge unit incorporating the hub assembly of the present invention.

FIG. 5 depicts an endless loop eight track cartridge tape unit employing the hub assembly of the present invention with the tape wound thereon. In particular, a lower casing member 60 is provided with a fixed spool shaft 62 extending from an inner face thereof which receives the inner hub member 45 of the hub assembly 10 in a loose fit to permit rotation of the hub assembly relative to the casing member 60. The tape 24 which is formed into an endless loop configuration in accordance with the foregoing, extends from the inner loop of the wound tape, over a guide post 68 projecting from the inner surface of the casing member 60, and over a pressure pad 66, or the like, mounted on the housing 60 for urging the tape towards an external magnetic head (not shown), in a conventional manner. The tape 24 passes from the pressure pad 66, over a roller 64 rotatably mounted relative to the casing member 60 and onto the outer loop of the wound tape.

The unit is completed by an upper housing 70 which engages the lower housing by means of binding posts 72 or the like in a conventional manner.

In operation the cartridge is placed in an external player unit (not shown) having a capstan which drivingly engages the roller 64, and a magnetic head engaging the tape. Upon rotation of the capstan in a manner to drive the roller 64 and therefore the taoe in a clockwise direction as viewed in FIG. 5, the tape pays out from the inner loop of the wound tape, and is fed onto the outer loop thereof in a conventional manner with the slack present in the supply of tape avoiding any frictional binding or the like, as discussed above.

Several variations may be made in the foregoing without departing from the scope of the present invention. For example, two hub assemblies of the present invention can be utilized in a magnetic tape cassette unit, and the hub assembly or assemblies can be used to receive flexible material other than magnetic tape.

Of course, other variations of the specific construction and arrangement of the invention can be made by those skilled in the art without departing from the invention as defined in the appended claims.

I claim

1. A hub assembly for a flexible material comprising a disc member, a hub member having an inner and outer diameter and extending from one face of said disc member for receiving the flexible material, said hub member being adapted for expansion in for radial direction, and at least one camming member having an outer surface and extending from the other face of said disc member in a coaxial relationship with said hub member, the entire outer surface of said camming member being tapered radially inwardly from said disc with the smaller diameter of said tapered outer surface being less than the inner diameter of said hub member and the larger diameter of said tapered outer surface being greater than the inner diameter of said hub member, said camming member being adapted to engage a corresponding hub member of another hub assembly and expand said corresponding hub member outwardly upon said hub assemblies being placed in an abutting relationship.

2. The assembly of claim 1 wherein said hub member is adapted to expand in said raidal direction upon being placed in an abutting relationship with another camming surface, and is adapted to contract to its original position upon release from said other camming surface.

3. The assembly of claim 2 wherein said hub member is formed by a plurality of axially extending fingers, the free ends of which are adapted for movement in said radial direction upon said expansion.

4. The assembly of claim 3 wherein said fingers are resilient and said free ends of said fingers are adapted to move back to their original positions due to their resilience upon said release from said other camming surface.

5. A method of transferring a flexible material onto at least one hub, comprising the steps of abutting a plurality of said hubs on a common support, camming each hub in a radially outward direction by a cooperating portion of its adjacent hub, winding the flexible material onto each hub in its expanded condition, and contracting each hub to create a slack in the wound flexible material.

6. The method of claim 5 wherein said step of winding is effected with said hubs in said abutting position on said support.

7. The method of claim 5 wherein each said hub is resilient and said step of contracting is effected by releasing said hubs from said abutting position wherein said hubs contract due to their resilience.

8. A magnetic tape unit comprising a casing; and at least one hub assembly rotatably mounted in said casing and comprising a disc member, a hub member having an inner and outer diameter and extending from one face of said disc member for receiving magnetic tape, said hub member being adapted for expansion in a radial direction, and at least one camming member having an outer surface and extending from the other face of said disc member in a coaxial relationship with said hub member, the entire outer surface of said camming member being tapered radially inwardly from said disc with the smaller diameter of said tapered outer surface being less than the inner diameter of said hub member and the larger diameter of said tapered outer surface being greater than the inner diameter of said hub member, said camming member being adapted to engage a corresponding hub member of another hub assembly and expand said corresponding hub member outwardly upon said hub assemblies being placed in an abutting relationship.

9. The unit of claim 8 wherein said hub member is adapted to expand in said radial direction upon being placed in an abutting relationship with another camming surface and is adapted to contract to its original position upon release from said other camming surface.

10. The unit of claim 9 wherein said hub member is formed by a plurality of axially extending fingers, the free ends of which are adapted for movement in said radial direction upon said expansion.

11. The unit of claim 10 wherein said fingers are resilient and said free ends of said fingers are adapted to move back to their original positions due to their resilience upon release of said hub member from said other camming surface.

12. The unit of claim 8 wherein one hub assembly is rotatably mounted in said casing and said tape is arranged in an endless loop to form an endless loop tape cartridge.

* * * * *